United States Patent Office 3,474,344
Patented Oct. 21, 1969

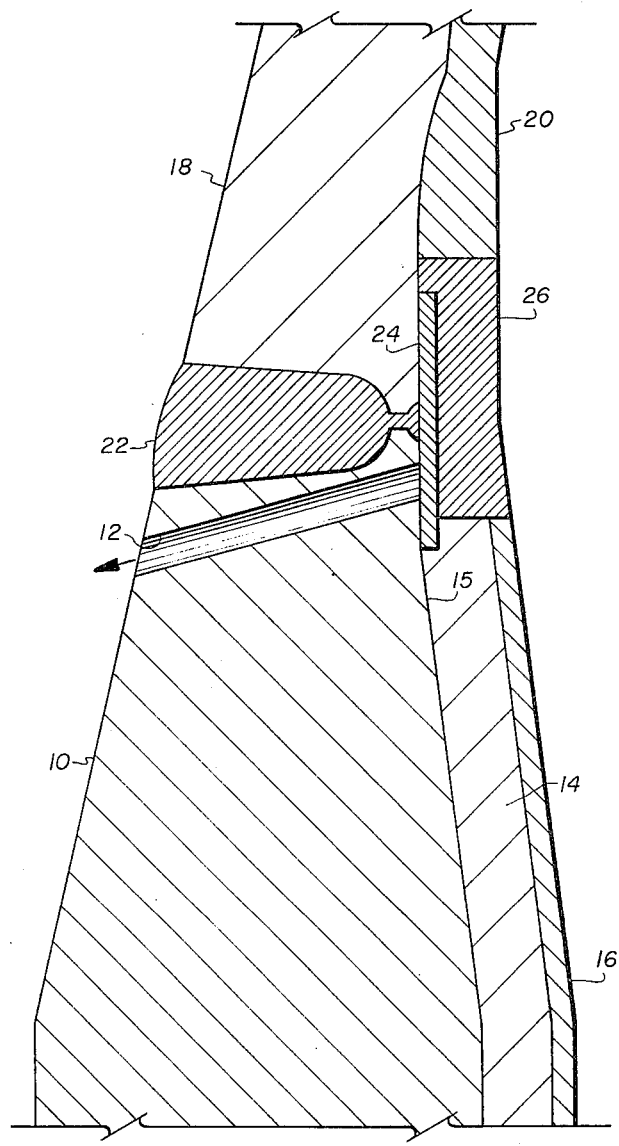

3,474,344
PRESSURE VESSEL FOR HYDROGEN
Alexander I. Perl, Flushing, N.Y., assignor to Foster
Wheeler Corporation, Livingston, N.J., a corporation of New York
Filed Apr. 4, 1968, Ser. No. 718,760
Int. Cl. B01j 3/00; B65d 25/14; B23k 31/02
U.S. Cl. 220—3
3 Claims

ABSTRACT OF THE DISCLOSURE

Weld clad head is attached to a pressure vessel having a metal to metal stainless liner with a mill clad loose backing strip and weld clad thereover.

Background of the invention

This invention was developed for pressure vessels containing hydrogen, such as ammonia reactor vessels.

For reasons of economy, the shell plate of this vessel is made of high strength quenched and tempered carbon steel material. Under typical operating conditions some of the hydrogen becomes nascent H instead of $H_2$. At high pressures and temperatures nascent hydrogen has the remarkable ability to permeate the linear and walls of the vessel. In a steel such as the shell plate, where the carbon in the metal is not tightly bonded by alloying elements such as molybdenum or columbium the hydrogen reacts with the carbon to form methane, $CH_4$. The methane builds up sufficient pressure in tiny molecular voids in the metal to cause fissures. The build up of such fissures destroys the metal ductility and eventually its strength in a phenomenon known as hydrogen embrittlement, which proceeds as a function of temperature, pressure and time.

Summary of the invention

Applicant's invention provides metal to metal contact under hydraulic pressure, but with no metallurgical bond therebetween thereby providing an escape path for hydrogen that permeates through the liner. Outboard of this boundary the hydrogen pressure cannot build up and damage the shell plate. Inboard of the liner, and in the vessel head, an alloy not subject to hydrogen embrittlement must be used.

Brief description of the drawing

In the drawing the single figure is a vertical cross section through the welded joint between the shell wall and the shell head of the pressure vessel for hydrogen according to the preferred embodiment of the present invention.

Description of the preferred embodiments

As shown, the pressure vessel has an outer wall 10 of material selected for strength only, such as a low cost, high strength, quenched and tempered shell plate of carbon steel. This wall 10 has a vent hole 12 therethrough near the top for hydrogen.

The pressure vessel also comprises an inner liner 14 of material not subject to hydrogen embrittlement, preferably a stainless or chromium alloy steel. This liner is in metal to metal contact with the outer wall 10 along the line 15 preferably hydraulically expanded therein, but with no metallurgical bond therebetween, thereby providing an escape path for hydrogen that permeates through the liner. The liner 14 has an inner cladding 16 of hydrogen resistant material.

On top of the outer wall 10 is a shell head 18 of material not subject to hydrogen embrittlement, preferably the same as that of the liner 14. The head 18 is weld clad as at 20 with a material resistant to hydrogen embrittlement, preferably the same as the shell liner cladding 16.

The bottom of the weld clad shell 18 is welded as at 22 to the top of the shell wall 10, and a loose backing strip 24 is placed in position over the weld 22 and over the inner end of the shell vent hole 12. A weld overlay 26 is applied over the loose backing strip 24, this overlay being preferably of the same material as the liner cladding 16 and the head cladding 20.

What is claimed is:
1. A pressure vessel for containing hydrogen comprising an outer shell of carbon steel;
    an inner liner of alloy not subject to hydrogen embrittlement;
    said liner being in metal to metal contact with said outer shell by hydraulically expanding said liner into said outer shell without any metallurgical bond therebetween, thereby providing an escape path for hydrogen that permeates through the liner;
    a shell head of alloy not subject to hydrogen embrittlement and weld clad with hydrogen resistant material, said shell head being welded to said outer shell;
    a loose backing strip placed in position over the weld between said shell head and outer shell; and a high ductility weld clad overly applied over said loose backing strip in contact with said inner liner and said shell head.
2. A pressure vessel according to claim 1 in which said interliner is selected from the group consisting of stainless steel and chromium alloy steel.
3. A pressure vessel according to claim 1 in which said interliner is a weld clad, hydrogen resistant material.

References Cited
UNITED STATES PATENTS 2,209,290  7/1940  Watts _____ 29—471.1 X
3,231,338  1/1966  Andrus _____ 23—290

RAPHAEL H. SCHWARTZ, Primary Examiner

U.S. Cl. X.R.
29—471.1, 482